United States Patent [19]

Sandis et al.

[11] 4,110,248

[45] Aug. 29, 1978

[54] MANUFACTURE OF CATALYSTS FOR POLYMERIZATION OF OLEFINS

[75] Inventors: Stylianos Sandis, Lavera; Jean Claude Bailly, Martigues, both of France

[73] Assignee: Naphtachimie Societe Anonyme, Paris, France

[21] Appl. No.: 764,566

[22] Filed: Feb. 1, 1977

[30] Foreign Application Priority Data

Feb. 3, 1976 [FR] France .................................. 76 02898

[51] Int. Cl.$^2$ ................................................ C08F 4/64
[52] U.S. Cl. .................................. 252/429 B; 526/142
[58] Field of Search .................................... 252/429 B

[56] References Cited

U.S. PATENT DOCUMENTS

| | | | |
|---|---|---|---|
| 3,116,274 | 12/1963 | Boehm et al. | 252/429 B X |
| 3,129,256 | 4/1964 | Hay et al. | 252/429 B X |
| 3,652,705 | 3/1972 | Arakawa et al. | 252/429 B X |
| 3,758,621 | 9/1973 | Morikawa et al. | 252/429 B X |
| 3,784,481 | 1/1974 | Lassau et al. | 252/429 B X |
| 3,813,374 | 5/1974 | Perry | 252/429 B X |
| 3,864,278 | 2/1975 | La Heij et al. | 252/429 B |

*Primary Examiner*—Patrick P. Garvin

[57] ABSTRACT

A catalyst for use in the polymerization of olefins and a process for its manufacture wherein an excess titanium tetrachloride is reduced by an organoaluminum reducing agent, with the ratio of moles of titanium tetrachloride to the number of gram equivalents of the organoaluminum compound being at least 1.8. The catalyst is prepared in the presence of an aliphatic ether to produce titanium trichloride having regularly-shaped granules and improved catalytic properties suitable for use with an organoaluminum co-catalyst in the polymerization of olefins.

8 Claims, No Drawings

MANUFACTURE OF CATALYSTS FOR POLYMERIZATION OF OLEFINS

The invention relates to a process for the production of catalysts based on titanium trichloride which can be used with an organometallic co-catalyst in the polymerization of alpha-olefins.

It is known to polymerize alpha-olefins such as ethylene or propylene under pressures which are generally below 40 bars using a catalytic system containing, on the one hand, a titanium trichloride-based catalyst, and, on the other, an organometallic co-catalyst, conventionally in the form of an organoaluminum compound. Various methods have already been proposed for the preparation of titanium trichloride-based catalysts. One of these comprises reducing at a temperture between $-50°$ and $+150°$ C titanium tetrachloride normally diluted with an inert solvent (such as saturated liquid hydrocarbon) with a reducing or organometallic compound such as diethyl aluminum chloride used in molar quantities between 0.1 and 100 relative to the titanium tetrachloride. A precipitate is formed which mainly contains titanium trichloride. It is then recommended to perform a maturing or aging operation which consists of keeping the precipitate in its formation medium for between a few minutes and several hours, or after having separated it, maintaining it at a temperature equal to or higher than the precipitate formation temperature. In general, the precipitate is washed, preferably after maturing, by means of an inert solvent such as a saturated liquid hydrocarbon in such a way that the reaction by-products are removed.

It has now been found that the use of quantities of titanium tetrachloride well above the quantity which can be reduced by the reducing organometallic compound in the preparation of the above-mentioned catalysts does indeed lead to the formation of a titanium trichloride precipitate but the latter has a weak catalytic activity in the polymerization of alpha-olefins. Moreover, these catalysts lead to polymers with a very low apparent density, causing difficulties during the transformation of the polymers.

However, it has been observed, and this forms the basis of the invention, that it is possible to prepare catalysts having a surprising activity by using a quantity of titanium tetrachloride which is higher than the quantity which can be reduced, together with an organoaluminum compound and an aliphatic ether in the conditions to be defined hereinafter.

The invention relates to a process for the production of catalysts based on titanium trichloride which can be used in the polymerization of alpha-olefins and which comprises reducing excess titanium tetrachloride by an organoaluminum compound, then maturing the precipitate formed in its formation medium, the process being characterized in that the ratio of the number of titanium tetrachloride moles to the number of organic gram equivalents of the organoaluminum compound is at least equal to 1.8. The organoaluminum compound comprises a compound of $AlR_nX_{3-n}$ in which R is an alkyl, cycloalkyl, aryl or aralkyl group containing 1 to 12 carbon atoms, X is a hydrogen or halogen atom, preferably chlorine or bromine and $n$ is an integer or fraction which can assume any value between 1 and 3 and preferably between 1.5 and 3. The process is performed in the presence of 2 to 5 moles per mole of organoaluminum compound in one or several aliphatic ethers of formula R'—O—R" in which R' and R" are alkyl groups containing 1 to 5 carbon atoms, the reduction of the titanium tetrachloride is performed between $-10°$ and $+60°$ C and preferably between $0°$ and $50°$ C, and the maturing of the precipitate is performed between $20°$ and $100°$ C, and preferably between $30°$ and $80°$ for a period between 15 minutes and 24 hours, and preferably between 1 and 4 hours.

As stated hereinbefore, the quantity of titanium tetrachloride used must be at least equal to 1.8 moles per organic gram equivalent of the organoaluminum compound. When the latter comprises, for example, a dialkyl aluminum chloride having two organic reducing groups per molecule, i.e., two organic gram equivalents per mole, this means that the molar ratio of titanium tetrachloride to dialkyl aluminum chloride is equal to or greater than 3.6. The titanium tetrachloride quantity used can reach much higher values without being prejudicial to the results obtained. However, for practical reasons the titanium tetrachloride quantity used can be limited to molar values below 50 and preferably between 2 and 10 times the number of organic gram equivalents of the organoaluminum compound.

To facilitate operation, the process of the invention can be performed in the presence of an inert solvent such as an aliphatic liquid hydrocarbon. This solvent can be mixed with titanium tetrachloride, with the organoaluminum compound, the ether or two or more of these compounds.

The titanium tetrachloride is advantageously reduced under conditions of slightly turbulent stirring in such a way that a titanium trichloride precipitate is obtained which is formed from regularly shaped granules and which are preferably substantially spherical which are easy to use in the polymerization of alpha-olefins.

A method of reducing the titanium tetrachloride consists of bringing together the reagents at a sufficiently low temperature, between $-40°$ and $-10°$ C, to prevent the reaction occurring, followed by heating the mixture, preferably accompanied by stirring, to a temperature which is sufficient for the reaction to take place, namely between $-10°$ and $50°$ C.

The titanium tetrachloride reduction is preferably effected, according to another operation procedure, by previously preparing a mixture of the organoaluminum compound and of at least one fraction of the ether or ethers at a temperature between $-40°$ and $+50°$ C and preferably between $0°$ and $30°$ C. The ether quantity is selected in such a way that the ratio of the number of moles of ether to the number of moles of the organoaluminum compound is between 0.30 and 5. This mixture can advantageously be diluted by an inert solvent such as a saturated liquid hydrocarbon. The reduction of the titanium tetrachloride is then performed by introducing the thus prepared mixture into the titanium tetrachloride. If desired, the latter can be diluted with a fraction of the ether or ethers and optionally insert solvent. This introduction preferably takes place in a slow and regular manner accompanied by slightly turbulent stirring in such a way that there is good contacting of the reagents without bringing about the formation of large quantities of titanium trichloride particles with a diameter below 10 microns.

Reduction of the titanium tetrachloride generally takes place at a constant temperature, but it is also possible to vary the temperature during the operation in wuch a way, for example, as to terminate the reduction at the temperature chosen for maturing.

The thus formed precipitate is then kept in its preparation medium, preferably accompanied by stirring during the maturing process mentioned hereinbefore. Maturing can be performed at a constant temperature, which if desired, can be identical to the titanium tetrachloride reduction temperature. However, it is also possible to vary the temperature during maturing, whereby the temperature is normally increased during this operation. It is preferable to wash the catalyst obtained after maturing by means of an inert solvent such as saturated hydrocarbon before using it in the polymerization of the olefins. This washing can easily be performed by decanting the precipitate and eliminating the supernatant liquid which can be replaced a certain number of times by fresh solvent in order to remove from the catalysts soluble compounds which it may still contain and in particular excess titanium tetrachloride.

The thus obtained catalysts can be kept protected from air and moisture without their catalytic properties being impaired.

The catalysts prepared according to the process of the invention have a powerful catalytic activity in the polymerization of olefins, both in the presence of a liquid dispersing agent and in the gaseous phase. These catalysts can be used in the polymerization or co-polymerization of olefins of formula $CH_2=CHR'''$ in which $R'''$ represents hydrogen or an alkyl radical with 1 or 8 carbon atoms. In this type of polymerization, the catalysts are associated with cocatalysts preferably selected from among the organometallic compounds of metals of groups II and III of the periodic system of elements, such as organoaluminum compounds of formula $AlR_m^{IV}X_{3-m}$, in which $R^{IV}$ represents an alkyl group with 1 to 12 carbon atoms, X a hydrogen or halogen atom, preferably chlorine, and $m$ an integer or fraction which can assume any value between 1 and 3. These co-catalysts are advantageously used in quantities such that the molecular ratio of the group II and III metals of the co-catalysts to the titanium of the catalysts is between 1 and 50.

According to a variant, the olefins can be polymerized in the presence of electron donors constituted by compounds containing at least one free electronic doublet carried by an atom such as oxygen, sulphur, nitrogen or phosphorus, whereby these electron donors preferably comprise ethers in accordance with the definition given hereinbefore.

The catalysts according to the invention are particularly suitable for the polymerization of olefins according to the so-called low pressure method which consists in general of operating at a pressure below 40 bars and at a temperature between 40° and 150° C. Polymerization can be carried out within a liquid in which the catalyst is dispersed whereby said liquid can comprise the liquefied monomer or a saturated aliphatic hydrocarbon. Polymerization can also take place in the gaseous phase in the absence of a liquid diluent. During polymerization, it is possible to control the average molecular weight of the polymer formed via a chain limiter such as hydrogen in molecular proportions compared with the olefin to be polymerized which are generally between 0.1 and 60%. Polymerization is stopped when the reaction has progressed to the desired extent. The average molecular weight of the polymer obtained is most frequently between 50,000 and 1,000,000 when the polymers are to be used in the conventional applications of thermoplastic materials. Due to the high activity of the catalysts according to the invention, the polymers obtained only contain very small quantities of catalytic residues, and they can generally be used without prior purification.

The catalysts prepared according to the invention are of particular interest in the polymerization of propylene and its higher homologues due to the face that their high activity is accompanied by high stereospecificity. Expressed as a percentage by weight of the polypropylene insoluble in boiling n-heptane, this stereospecificity is above 93% and frequently reaches 95% and higher.

Having described the basic concepts of the invention, reference is now made to the following examples which are provided by way of illustration, and not by way of limitation, of the practice of this invention, demonstrating its advantages over the prior art.

EXAMPLE 1

A. Preparation of the Catalyst

The reactor used in this example is a 1-liter glass reactor equipped with a mechanical stirrer in the form of a parallelepipedic flat blade whose dimensions are 35 × 50 × 2 mm and which rotates at 220 r.p.m. The reactor is equipped with a heating or cooling device which acts through the wall. Into this reactor are introduced 380 g (2 moles) of $TiCl_4$ and 120 ml of n-heptane at 25° C. The mixture is heated to 35° C, and a solution at 25° C, obtained by mixing 93.4 g (0.59 mole) of diisoamyl ether and 30 g (0.25 mole) of diethyl aluminum chloride dissolved in 180 ml of n-heptane, is intorduced into the mixture which is maintained at 35° C over a period of 4 hours at a regular flow rate. A precipitate is obtained which is stirred for 1 hour at 35° C and then for 2 hours at 65° C. The precipitate obtained, which contains 0.49 g.at. of titanium, is washed five times by decanting with 500 ml of n-heptane at 65° C. The thus prepared catalyst is in the form of a violet precipitate and is kept in n-heptane sheltered from air and moisture. The average diameter of the particles forming the same is 43 microns.

B. Polymerization of the Propylene

The reactor used here is a 5-liter stainless steel reactor equipped with an impeller-type mechanical stirrer rotating at 500 r.p.m. The reactor is also equipped with a double jacket heating and cooling device. After purging it with nitrogen, 2 liters of n-heptane, 16 millimoles of diethyl aluminum chloride and a quantity of the catalyst prepared in Example 1A corresponding to 0.8 m.g.at. of titanium are successively introduced into the reactor. The reaction medium is brought to 65° C, propylene is introduced thereinto until an absolute pressure of 7 bars is obtained, which is kept constant throughout the polymerization process. 200 mlN of hydrogen are introduced into the reactor after 30 minutes, 1 hour, 1½ hours, 2 hours, 3 hours and 4 hours of polymerization. After polymerizing for 5 hours, the unpolymerized propylene is degasified, the n-heptane is entrained with water vapor and the polymer is dried. 630 g of a polypropylene is collected whose characteristics are as follows:

Titanium content: 61 ppm (parts per million by weight);

fraction soluble in boiling n-heptane: 2.2% fluidity index under 2.16 kg at 230° C: 2.9;

apparent density (or bulk density) in g/cc: 0.44.

EXAMPLE 2

A. Preparation of the Catalyst

Working takes place as in Example 1A, except that a part of the diisoamyl ether is introduced mixed with $TiCl_4$. 380 g (2 moles) of $TiCl_4$, 120 ml of n-heptane and 27 g (0.17 mole) of diisoamyl ether are introduced into the reactor. The diisoamyl ether quantity introduced in solution with 30 g of diethyl aluminum chloride is 70 g (0.44 mole). A violet precipitate is obtained with an average diameter of 28 microns containing 0.49 g.at. of titanium.

B. Polymerization of the Propylene

Working takes place as in Example 1B. After polymerizing for 5 hours, 610 g of polypropylene are obtained whose characteristics are as follows:
Titanium content in ppm: 63;
fraction soluble in boiling n-heptane: 3.4%;
fluidity index under 2.16 kg at 230° C: 3.0;
apparent density in g/cc: 0.44.

EXAMPLE 3

A. Preparation of the Catalyst

Working takes place as in Example 2A except that the quantities of diisoamyl ether introduced respectively with the titanium tetrachloride and with the diethyl aluminum chloride are inverted; thus 70 g of diisoamyl ether are mixed with $TiCl_4$ and 27 g of the ether are introduced in solution with diethyl aluminum chloride. A violet precipitate is obtained with an average diameter of 15 microns containing 0.48 g.at. of titanium.

B. Polymerization of the Propylene

Working takes place as in Example 1B. After polymerizing for 5 hours, 630 g of a polypropylene are collected whose characteristics are:
Titanium content in ppm: 61;
fraction soluble in boiling n-heptane: 2.8%;
fluidity index under 2.16 kg at 230° C: 2.3;
apparent density in g/cc: 0.43.

C. Polymerization of the Ethylene

Working takes place in a reactor identical to that described in 1B except that stirring takes place at 750 r.p.m. 2 liters of n-heptane, 4 millimoles of tri-n-octyl aluminum and a quantity of catalyst prepared in 3A corresponding to 0.8 m.g.at. of titanium are introduced successively into the reactor. On bringing the reaction medium to 70° C, hydrogen is injected into it until an absolute hydrogen pressure of 1.5 bars is obtained. Ethylene is then introduced at a constant flow rate equal to 160 g/h. After polymerizing for 5 hours at 70° C, a polyethylene powder is obtained which has a titanium content of 60 ppm. and an apparent density of 0.42 g/cc.

EXAMPLES 4 and 5

A. Preparation of the Catalyst

Working takes place as in Example 3A by varying the quantities of diisoamyl ether used with the titanium tetrachloride as indicated in Table I.

TABLE I

|  | Example 4 | Example 5 |
|---|---|---|
| Solution of $TiCl_4$: |  |  |
| $TiCl_4$ (moles) | 2 | 2 |
| Diisoamyl ether (moles) | 0.22 | 0.81 |
| n-heptane (ml) | 120 | 120 |
| Diethyl aluminum chloride solution (DEA): |  |  |
| DEA (moles) | 0.25 | 0.25 |
| Diisoamyl ether (moles) | 0.17 | 0.17 |
| n-heptane (ml) | 180 | 180 |
| Molar ratio: |  |  |
| Total diisoamyl ether/DEA | 1.56 | 3.92 |
| Diisoamyl ether in solution with DEA/DEA | 0.68 | 0.68 |

TABLE I-continued

|  | Example 4 | Example 5 |
|---|---|---|
| Catalyst obtained: |  |  |
| Yield (g. at. of titanium) | 0.49 | 0.35 |
| Average diameter (microns) | 21 | 10 |

B. Propylene Polymerization

Working takes place as in Example 1B. After polymerizing for 5 hours, polymers are obtained whose characteristics are given in Table II.

TABLE II

|  | Example 4 | Example 5 |
|---|---|---|
| Polymer obtained: |  |  |
| Weight (g) | 145 | 440 |
| Titanium content (ppm) | 265 | 87 |
| Solubility in boiling n-heptane (%) | 7 | 4.3 |
| Fluidity index under 2.16 kg at 230° C | 3.5 | 2.7 |
| Apparent density (g/cc) | 0.32 | 0.30 |

It can be seen that the catalyst of Example 4 which was prepared with a molar ratio of diisoamyl ether to DEA of 1.56 when used in the polymerization of propylene leads to results which are well below those obtained with the catalysts of Examples 3 and 5, both as regards the catalytic activity and the crystallinity (solubility in boiling n-heptane).

EXAMPLES 6 to 9

A. Preparation of the Catalyst

Working takes place as in Example 2A by varying the titanium tetrachloride quantity as indicated in Table III.

TABLE III

|  | Examples | | | |
|---|---|---|---|---|
|  | 6 | 7 | 8 | 9 |
| $TiCl_4$ (moles) | 1.25 | 1 | 0.75 | 0.50 |
| Moles of $TiCl_4$ (DEA reducing groups) | 2.50 | 2 | 1.50 | 1 |
| Catalyst obtained: |  |  |  |  |
| Yield (g. at. of titanium) | 0.49 | 0.49 | 0.44 | 0.47 |
| Average diameter (microns) | 25 | 26 | 25 | 25 |

B. Polymerization of the Propylene

Working takes place as in Example 1B. After polymerizing for 5 hours, polymers are collected whose characteristics are given in Table IV.

It can be seen that the catalysts of Examples 8 and 9 lead to the formation of polypropylenes containing a high content of soluble polymer. These catalysts were prepared with a ratio of moles of $TiCl_4$ to gram equivalents of DEA below 1.80.

TABLE IV

|  | Examples | | | |
|---|---|---|---|---|
|  | 6 | 7 | 8 | 9 |
| Polymer obtained: |  |  |  |  |
| Weight (g) | 630 | 670 | 510 | 405 |
| Titanium content (ppm) | 61 | 57 | 75 | 95 |
| Solubility in boiling n-heptane (%) | 3.2 | 4.3 | 23.5 | 16.5 |
| Fluidity index under 2.16 kg at 230° C | 2.7 | 3.1 | — | 9.8 |
| Apparent density (g/cc) | 0.47 | 0.49 | — | 0.37 |

EXAMPLE 10

(Comparative Test)

A. Preparation of the Catalyst

Working takes place as in Example 1A except that all the diisoamyl ether, i.e., 93.4 g (0.59 mole) is mixed with the titanium tetrachloride and not with the diethyl aluminum chloride. A brown precipitate is obtained containing 0.40 g.at. of titanium and comprising particles whose average diameter is below 9 microns.

B. Polymerization of the Propylene

Working takes place as in Example 1B. After polymerizing for 5 hours, only small quantities of polypropylene are obtained which are inadequate for analysis.

EXAMPLE 11

(Comparative Test)

A. Preparation of the Catalyst

Working takes place as in Example 1A except that diisoamyl ether is not introduced into the reaction medium (neither with the titanium tetrachloride nor with the diethyl aluminum chloride). A violet precipitate is obtained whose average particle diameter exceeds 100 microns.

B. Polymerization of the Propylene

Working takes place as in Example 1B. After polymerizing for 5 hours, only small quantities of polypropylene are collected which are insufficient to be analyzed.

EXAMPLE 12

A. Preparation of the Catalyst

Working takes place as in Example 3A except that the $TiCl_3$ precipitate is kept at 35° C for 13 hours without heating to 65° C. A violet precipitate is obtained containing 0.41 g.at. of titanium whose particles have an average diameter of 15 microns.

B. Polymerization of the Propylene

Working takes place as in Example 1B. After polymerizing for 5 hours, 334 g of a polypropylene are obtained whose characteristics are:
  Titanium content in ppm: 115;
  soluble fraction in boiling n-heptane: 6.1%;
  fluidity index under 2.16 kg at 230° C: 1.0;
  apparent density in g/cc: 0.40.

EXAMPLE 13

A. Preparation of the Catalyst

Working takes place as in Example 3A except that the $TiCl_4$ is reduced at 60° C instead of at 35° C and the precipitate is kept for 2 hours at 60° C in its preparation medium. A black precipitate is obtained containing 0.43 g.at. of titanium whose particles have an average diameter of 15 microns.

B. Polymerization of the Propylene

Working takes place as in Example 1B. After polymerizing for 5 hours, 154 g of a polypropylene are obtained whose characteristics are as follows:
  Titanium content in ppm: 249;
  soluble fraction in boiling n-heptane: 3.2%;
  fluidity index under 2.16 kg at 230° C: 0.6;
  apparent density in g/cc: 0.33.

EXAMPLE 14

A. Preparation of the Catalyst

Working takes place as in Example 2A except that precipitation is performed at 0° C instead of 35° C. The precipitate is then kept for 1 hour at 0° C in its preparation medium and is then heated to 65° C and kept at this temperature for 2 hours. A brown precipitate is obtained containing 0.40 g.at. of titanium and comprising particles of average diameter of 21 microns.

B. Polymerization of the Propylene

Working takes place as in Example 1B. After polymerizing for 5 hours, 336 g of a polypropylene are obtained whose characteristics are as follows:
  Titanium content in ppm: 114;
  soluble fraction in boiling n-heptane: 4.4%;
  fluidity index under 2.16 kg at 230° C: 3.7;
  apparent density in g/cc: 0.23.

EXAMPLE 15

A. Preparation of the Catalyst

Working takes place as in Example 3A except that the diisoamyl ether is replaced by di-n-butyl ether. The quantities of reagents used are as follows: 380 g (2 moles) of $TiCl_4$, 120 ml of n-heptane and 67 g (0.51 mole) of di-n-butyl ether on the one hand and 30 g (0.25 mole) of diethyl aluminum chloride and 22 g (0.17 mole) of di-n-butyl ether in 180 ml of n-heptane on the other hand.

The catalyst is in the form of a violet precipitate whose particles have an average diameter of 25 microns.

B. Polymerization of the Propylene

Working takes place as in Example 1B. After polymerizing for 5 hours, 400 g of a polypropylene are collected whose characteristics are:
  Titanium content in ppm: 96;
  soluble fraction in boiling n-heptane: 9%;
  fluidity index under 2.16 kg at 230° C: 2.9;
  apparent density in g/cc: 0.20.

EXAMPLE 16

A. Preparation of the Catalyst

Working takes place as in Example 3A except that the diethyl aluminum chloride is replaced by triethyl aluminum. The quantities of reagents used are the same as those of Example 3A except that the organoaluminum compound is constituted by 20 g (0.17 mole) of triethyl aluminum. The catalyst obtained is in the form of a violet precipitate containing 0.43 g.at. of titanium, whose particles have an average diameter of 14 microns.

B. Polymerization of the Propylene

Working takes place as in Example 1B. After polymerizing for 5 hours, 610 g of a polypropylene are collected whose characteristics are:
  Titanium content in ppm: 63;
  soluble fraction in boiling n-heptane: 4.7%;
  fluidity index under 2.16 kg at 230° C: 6.6;
  apparent density in g/cc: 0.47.

EXAMPLE 17

A. Preparation of the Catalyst

Working takes place under the same general conditions as in Example 1, starting, on the one hand, with a solution of 190 g (1 mole) of $TiCl_4$ and 35 g (0.22 mole) of diisoamyl ether in 60 ml of n-heptane and on the other with a solution of 16.6 g (0.084 mole) of triisobutyl aluminum and 13.5 g (0.085 moles) of diisoamyl ether in 325 ml of n-heptane.

The catalyst obtained is in the form of a violet brown precipitate whose particles have an average diameter of 40 microns.

B. Polymerization of the Propylene

Working takes place as in Example 1B. After polymerizing for 5 hours, 580 g of a polypropylene are obtained whose characteristics are:
Titanium content in ppm: 66;
soluble fraction in boiling n-heptane: 5.7%;
fluidity index under 2.16 kg at 230° C: 20;
apparent density in g/cc: 0.34.

EXAMPLE 18

A. Preparation of the Catalyst

Working takes place as in Example 3A, except that the diethyl aluminum chloride is replaced by 62 g (0.17 mole) of tri-n-octyl aluminum. The catalyst obtained is in the form of a maroon precipitate with a considerable variety of grain sizes.

B. Polymerization of the Propylene

Working takes place as in Example 1B. After polymerizing for 5 hours, 440 g of a polypropylene are obtained whose characteristics are:
Titanium content in ppm: 87;
solubility fraction in boiling n-heptane: 6.6%
fluidity index under 2.16 kg at 230° C: 4.7;
apparent density in g/cc: 0.44.

EXAMPLE 19

A. Preparation of the Catalyst

Working takes place as in Example 3A except that the diethyl aluminum chloride is replaced by 42 g (0.17 mole) of ethyl aluminum sesquichloride of formula $(C_2H_5)_3Al_2Cl_3$. A catalyst is obtained containing 0.32 g.at. of titanium in the form of a violet precipitate whose particles have an average diameter of 14 mircons.

B. Polymerization of the Propylene

Working takes place as in Example 1B. After polymerizing for 5 hours, 610 g of a polypropylene are obtained whose characteristics are:
Titanium content in ppm: 63;
soluble fraction in boiling n-heptane: 3.6%;
fluidity index under 2.16 kg at 230° C: 4.5;
apparent density in g/cc: 0.41.

EXAMPLE 20

A. Preparation of the Catalyst

Working takes place as in Example 3A except that the diethyl aluminum chloride is replaced by 63.5 g (0.5 mole) of monoethyl aluminum dichloride. 0.185 mole of a catalyst are obtained in the form of a black precipitate whose particles have an average diameter of 20 microns.

B. Polymerization of the Catalyst

Working takes place as in Example 1B. After polymerizing for 5 hours, 198 g of a polypropylene are obtained whose characteristics are:
Titanium content in ppm: 194;
soluble fraction in boiling n-heptane: 13.4%;
fluidity index under 2.16 kg at 230° C: 0.3;
apparent density in g/cc: 0.30.

It will be understood that various changes and modifications can be made in the details of procedure, formulation and use without departing from the spirit of the invention, especially as defined in the following claims.

We claim:

1. In a process for the production of solid catalysts based on titanium trichloride used in the polymerization of alpha-olefins wherein titanium tetrachloride is reduced by an organoaluminum compound to form a precipitate, and then the precipitate is aged in the presence of its formation media, the improvement comprising reducing the titanium tetrachloride with the organoaluminum compound such that the ratio of the number of titanium tetrachloride moles to the number of organic gram equivalents of the organoaluminum compound is at least equal to 1.8, with the organoaluminum compound being a compound having the general formula $AlR_nX_{3-n}$ in which R is an alkyl, cycloalkyl, aryl or aralkyl group containing 1 to 12 carbon atoms, X is a hydrogen or halogen atom, and $n$ is an integer or fraction which can assume any value between 1 and 3, the process being performed in the presence of 2 to 5 moles, per mole of organoaluminum compound, of one or several aliphatic ethers of formula $R'-O-R''$ in which $R'$ and $R''$ are alkyl groups containing 1 to 5 carbon atoms, at least a portion of said ether being mixed with the organoaluminum compoound in the absence of the titanium tetrachloride, the ratio of the number of moles of ether to the number of moles of the organoaluminum compound in said mixture being between 0.3 and 5, the reduction of the titanium tetrachloride is performed between $-10°$ and $+60°$ C, and the aging of the precipitate is performed between 20° and 100° C, for a period between 15 minutes and 24 hours, and recovering the solid catalyst.

2. Process according to claim 1, wherein the ratio of the number of moles of titanium tetrachloride to the number of organic gram equivalents of the organoaluminum compound is between 1.8 and 50.

3. Process according to claim 1 performed in the presence of a liquid aliphatic hydrocarbon.

4. Process according to claim 1 performed accompanied by slightly turbulent stirring.

5. Process according to claim 1, wherein the reduction of the titanium tetrachloride is affected by mixing the reagents at a temperature between $-40°$ and $-10°$ C and then heating the mixture obtained to a temperature between $-10°$ and $+50°$ C.

6. Process according to claim 1 wherein a mixture of ether and organoaluminum compound in inert solvent at a temperature between $-40°$ and $+50°$ C, such that the ratio of the number of moles of ether to the number of moles of organoaluminum compound is between 0.30 and 5, is first prepared and then the introduction of this mixture into titanium tetrachloride.

7. Process according to claim 1 wherein the catalyst is washed after aging by an inert solvent.

8. A solid catalyst prepared by the process of claim 1.

* * * * *